(12) United States Patent
Jun et al.

(10) Patent No.: US 6,964,021 B2
(45) Date of Patent: Nov. 8, 2005

(54) METHOD AND APPARATUS FOR SKIMMING VIDEO DATA

(75) Inventors: Sung Bae Jun, Seoul (KR); Kyoung Ro Yoon, Seoul (KR); Bae Guen Kang, Seoul (KR); So Young Bae, Kyunggi-do (KR); Jae Shin You, Seoul (KR)

(73) Assignee: LG Electronics Inc., Seoul (KR)

( * ) Notice: Subject to any disclaimer, the term of this patent is extended or adjusted under 35 U.S.C. 154(b) by 497 days.

(21) Appl. No.: 09/932,713

(22) Filed: Aug. 17, 2001

(65) Prior Publication Data

US 2002/0051010 A1 May 2, 2002

(51) Int. Cl.[7] .............................................. G06F 15/00
(52) U.S. Cl. ...................................... 715/723; 715/726
(58) Field of Search ................................ 715/723, 726, 715/725, 719, 512; 345/716, 719, 720, 721, 723, 726, 727, 728; 348/700, 702

(56) References Cited

U.S. PATENT DOCUMENTS 5,521,841 A * 5/1996 Arman et al. ............... 345/723
5,956,026 A * 9/1999 Ratakonda .................. 345/723
6,188,396 B1 * 2/2001 Boezeman et al. ....... 715/500.1
6,331,859 B1 * 12/2001 Crinon ....................... 345/619
6,549,643 B1 * 4/2003 Toklu et al. ................ 382/107
6,642,940 B1 * 11/2003 Dakss et al. ................ 345/723

* cited by examiner

Primary Examiner—Cao (Kevin) Nguyen
(74) Attorney, Agent, or Firm—Hong, Degerman, Kang & Schmadeka

(57) ABSTRACT

The present invention relates to a system for searching and browsing multimedia, and more particularly, to a video skimming method and apparatus which is capable of summarizing the full content of a subject video data within a short time and rapidly moving to a desired section by skimming the content of the video based on scenes and shots formed by shot clustering and shot segmentation. The video skimming apparatus selects scenes to be reproduced and scenes to be skipped based on content-based video skimming, and then continuously reproducing a pertinent section in a shot of the scene or partially reproducing the same by utilizing a skipping technique.

24 Claims, 5 Drawing Sheets

Sections to be reproduced in video skimming using shot information

Frames to be reproduced
in skimming in reproduction section

METHOD AND APPARATUS FOR SKIMMING VIDEO DATA

CROSS REFERENCE TO RELATED ART

This application claims the benefit of Korean Patent Application Nos. 2000-48036 and 2000-55886, filed on Aug. 19, 2000 and Sep. 22, 2000, respectively, which are hereby incorporated by reference in their entirety.

BACKGROUND OF THE INVENTION

1. Field of the Invention

The present invention relates to a system for searching and browsing multimedia, and more particularly, to a video skimming system capable of skimming video data based on the information content of the video data.

2. Description of the Related Art

As mass media has progressed and the production of multimedia contents has become easier, the quantity of video and audio media information received by the general public every day has become substantial. As multimedia contents have become enormous, a desire for an automatic system for sorting data requested by a user has increased and the study of methods for complying with such request has also increased. Particularly, with the development of digital technology, there is a growing trend in which a video content is stored and distributed in a digital format. When digital broadcasting becomes popular, the digitalization of media will be accelerated.

With such a digital video content, a certain user may wish to view only sports-related news, or another user may wish to view business-related news. In addition, a certain user may request for viewing only scenes in which a particular person appears in a show program. In order to cope with such various kinds of user requests, various studies are being made.

Moreover, a user may request to grasp the full video contents within a limited time. Such a request is accepted by "Highlights." Generally, highlights can be understood as a newly configured content of important scenes from a video content. This includes, for example, "Sports Highlights", "Preview of Movie", "Headline News" and the like. However, in current technologies, it is very difficult to automate the extraction of highlights from a video content. Thus, in most cases, this extraction is manually performed. As mentioned above, as the quantity of media has been increased explosively, many human powers are needed to manually provide highlights of every video content, which is almost impossible. Therefore, an automation system is needed in order to allow a user to understand the outline of the content within a short time.

With the development of digital technologies, a key frame is used to move to a desired position in a video content. By using a video summary using the key frame, a user can move to a desired person rapidly. A large number of key frames are needed in order to easily search for a desired section by using the key frame, but it is difficult to display a large number of key frames in a limited display space. Thus, the user is requested to perform many selection works. In addition, generally, it is difficult to understand the fall content of video by the method using a key frame.

Recently, for searching for a desired scene in a digital video, various video indexing techniques are being studied. For a user wanting only scenes in which a particular person appears, the study of indexing information on the appearance of a person by the process of searching for a scene in which the person appears in a video and recognizing who the person is and the study of extracting principal scenes from a movie or sports and indexing the same are being made. However, the genres of video are very various and data to be indexed are very different by genres. Hence, it is known that it is very difficult to implement an automation system for extracting meaningful information with accuracy of high level by the current techniques.

On the other hand, in digital video, unlike analog video, the degradation of image quality can be prevented when fast wind/fast rewind functions are executed.

As a fast reproduction method generally used in a digital video, a method for increasing a number of frames decoded per unit time and displaying parts thereof, or a method for decoding and displaying frames while skipping a certain section is used.

However, in the method for increasing the number of frames decoded per unit time, it is disadvantageous in that the maximum speed is affected by the performance of a terminal device. Thus, for the fast wind/fast rewind of a digital video, the method for decoding and displaying frames while skipping a certain section is used. The fast wind/fast rewind technique in the digital video is the most reasonable one of existing techniques for complying with the request of the user wanting to understand the full content within a restricted time or wanting to move to a desired section. However, predetermined intervals of time are used in skipping a certain section, and thus there is a disadvantage that the user misses the scene of a desired section or a less important section is reproduced relatively often.

SUMMARY OF THE INVENTION

Accordingly, the present invention is directed to a video skimming apparatus and method therefor that substantially obviates one or more of the problems due to limitations and disadvantages of the related art.

An object of the present invention is to provide a method for recording received digital data streams on a recording medium as groups of stream objects and creating a search information for each stream object and a method for searching for requested data using the search information.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

A method for skimming video data wherein the video data is partitioned into a plurality of scenes, comprises the steps of obtaining a plurality of shots for each scene using a shot segmentation and forming a structure information index corresponding to each shot; selecting at least one shot from each scene based on the structure information index; selecting at least one section from the selected shot; and reproducing selected sections from each scene to skim the video data.

Alternatively, without using the scene content information, the video skimming may be carried out by selecting at least one shot from the video data based on the structure information index; selecting at least one section from the selected shot; and reproducing selected sections from each scene to skim the video data.

According to one aspect of the present invention, the structural information index includes at least one of scene information, shot information and temporal information. In particular, the scene information includes a logical story unit, the shot information includes a physical editing unit, and the temporal information includes information concerning start and end of each shot or scene.

According to another aspect of the present invention, when shots are being selected from each scene, selection of multiple shots having similar properties is minimized. In selecting shots to be reproduced from the multiple shots having the similar properties, shots to be used for skimming are selected by giving a higher weight value to shots located at the latter part of each scene.

According to another aspect of the present invention, when selecting at least one section from the selected shot, the selected section is from at least one of front section, rear section, center section of the selected shot. One preferred embodiment is to set each reproduction length of selected sections from selected shots the same. If the reproduction length of the selected section is larger than a shot length of the corresponding selected shot, then the reproduction length of the selected section is decreased to be less than or equal to the shot length.

Alternatively, each section comprises a plurality of frames and each reproduction length of selected sections from selected shots is chosen in response to a dissimilarity factor of neighboring frames. Preferably, the dissimilarity factor is determined in response to at least one of image, motion and audio similarities in individual shots, and the reproduction length of selected section is adjusted in response to the dissimilarity factor.

The image, motion and audio similarities in the selected shot representative of the selected scene includes similarities in frames, motion vectors and audio data with different time positions.

According to another aspect of the present invention, the reproduction of selected sections is varied in response to an external input. In addition, the selected sections is reproduced at a high speed by increasing a number of frames to be decoded per unit time.

According to another aspect of the present invention, each selected section comprises a plurality of frames and the selected sections are reproduced by selecting at least one frame from the corresponding section. When the video data uses a coding scheme utilizing interframe compression, then I frames are selected for obtaining frame data for decoding only corresponding frames.

A video skimming system for skimming video data wherein the video data is partitioned into a plurality of scenes comprises means for obtaining a plurality of shots for each scene using a shot segmentation and forming a structure information index corresponding to each shot; means for selecting at least one shot from each scene based on the structure information index; means for selecting at least one section from the selected shot; and means for reproducing selected sections from each scene to skim the video data.

A video skimming system for skimming video data wherein the video data is partitioned into a plurality of shots, wherein a structure information index is prepared based on content-based information using a shot segmentation, the video skimming system comprises means for selecting at least one shot from the video data based on the structure information index; means for selecting at least one section from the selected shot; and means for reproducing selected sections from each scene to skim the video data.

According to another embodiment of the present invention, a video skimming apparatus for searching and browsing digital video data comprises a user interface unit for inputting an external control information; a control unit for skimming the video data based on a structural information index for the video content according to the external control information from the user interface unit and selecting at least one shot from each scene based on the structure information index and selecting at least one section from the selected shot; a video information file for providing the structural information index for the video data to the control unit; and a display unit for reproducing the video skimmed by the control unit.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

With reference to the drawings, a video skimming system and method embodying the principles and concepts of the present invention will be described.

With the development of digital video techniques and image/video recognition techniques, it is desirable to search/filter and browse only a desired section of a desire video at a desired point of time.

Commonly used techniques for non-linear video browsing and searching are the shot segmentation technique and the shot clustering technique. These two techniques are the most essential ones for analyzing video data. Therefore, many studies have been concentrated on shot segmentation, and the study of the shot clustering technique is presently undertaken. In some cases, the shot segmentation can be automated, and the algorithm can be implemented with a high accuracy of more than 90%.

In addition, the shot clustering also can be automated with high accuracy by applying the technique conforming to the genre of a program by detecting a characteristic event or using general shot characteristics.

A video content is generally segmented logically into a several number of story units. Such a story structure unit is generally referred to as an event or scene, which includes, for example, a gunfight scene, a dialogue scene, etc. Such a scene is constructed as a sequence of sub-scenes or shots.

A shot denotes a sequence of video frames obtained from one camera without interruption. The shot is the most basic unit in video analysis or construction. A video stream is constructed of a sequence of many shots. A shot segmentation denotes a method for segmenting a video stream into individual shots. A shot clustering denotes a process for detecting a logical story structure of a video content by reconstructing the shots in logical scene units based on each of the individual shots and the characteristics thereof.

A video skimming system using scene and shot information, i.e., structural information of video content according to the preferred embodiment of the present invention will now be described with reference to the accompanying drawings.

Figure 1:
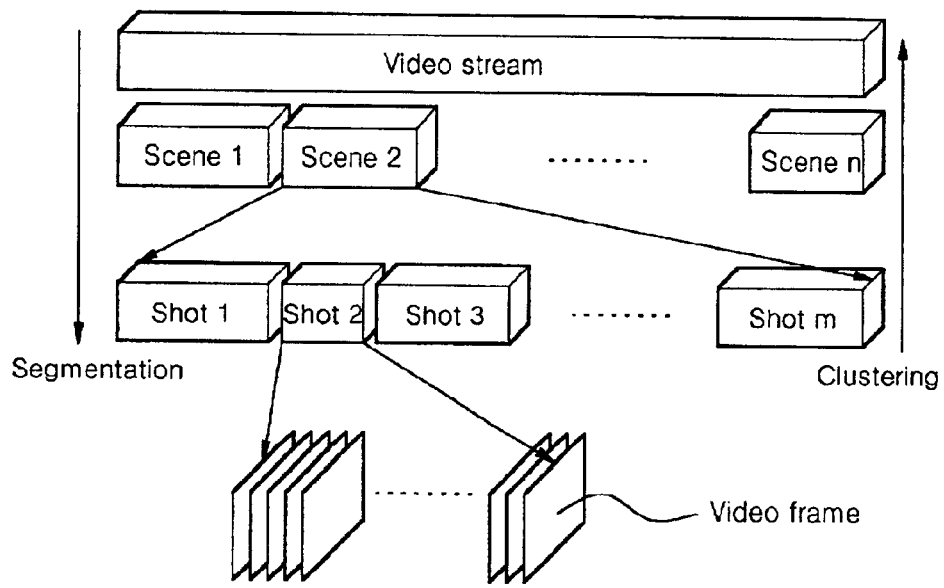
FIG. 1 illustrates a schematic diagram of shot segmentation and clustering.

FIG. 1 illustrates a schematic diagram of shot segmentation and clustering. Generally, the shot segmentation algorithms are based on the feature that image/motion/audio similarity is present in the same shots and the image/motion/audio dissimilarity is found between two different shots. The shot clustering algorithms are based on the feature that shots having similar characteristics are detected again within a predetermined time.

Generally, video highlights are a method for selecting meaningful segments in the progress of a video stream content and continuously reproducing these segments. However, it is very difficult to automate the selection of meaningful segments in the progress of various video contents.

Nevertheless, if shot segmentation information is used for video skimming, it is possible to implement a skimming method for reproducing only a certain section of each shot existing in every video and reproducing the remaining section at a length smaller than that of the original stream by using a skipping method. Such a skimming method is advantageous in that a complete automated skimming system can be constructed since the shot segmentation technique can be automated. In addition, the problem of reproducing an unimportant scene at a large length or missing an important scene generated during fast forward/fast rewind for general digital video can be reduced.

Figure 2:
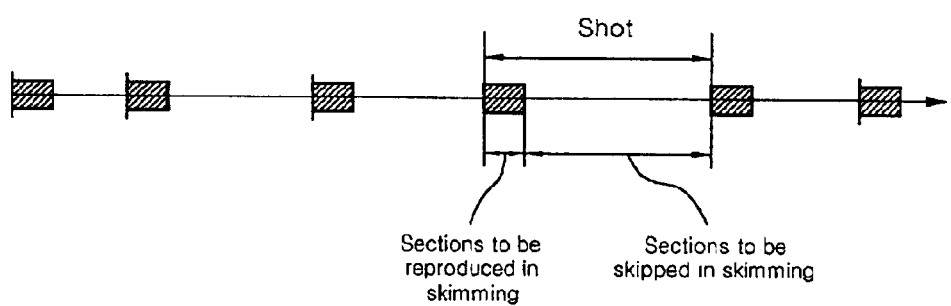
FIG. 2 illustrates a schematic diagram of a video skimming method using shot segmentation information according to present invention.

FIG. 2 illustrates a schematic diagram of a video skimming method using shot segmentation information according to present invention. A shaded section in FIG. 2 indicates a section to be reproduced in the skimming method using shot segmentation information. The remaining section indicates a section to be skipped during the skimming method.

However, when only the shot segmentation information is used for the video skimming, the scene information, which is a logical story structure existing in video content, is not used, and therefore repetitive shots, such as a dialogue scene, are continued to be played in a particular event section.

Figure 3:
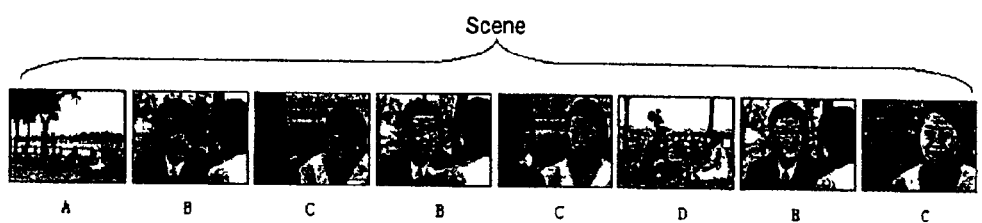
FIG. 3 illustrates a schematic diagram of a method of transitioning a dialogue scene into a plurality of shots.

FIG. 3 illustrates a schematic diagram of a method of transitioning a dialogue scene into a plurality of shots. In FIG. 3, each shot is represented with alphabet letters based on shot properties detected by the shot segmentation process. For example, the dialogue scene represented in FIG. 3 is a scene constructed of many shots in which two characters or actors are viewed in close-up.

However, if only the shot segmentation information is used in video skimming, every certain section of each of the shots in the dialogue scene is reproduced. Therefore, there is a disadvantage that similar scenes are reproduced at length without other additional information.

According to the preferred embodiment of the present invention, the above-mentioned disadvantage is overcome by performing the video skimming by considering shot information as well as scene information as structural information of a video content or stream.

A video skimming system and method according to the preferred embodiment of the present invention picks out shots to be reproduced and shots to be skipped from each scene of a video content pursuant a content-based determination and reproduces only a certain section (segment) of the shot to be reproduced and reproducing the remaining section at a length smaller than that of the original video stream by skipping. Alternatively, the present invention also selects the shots for skimming reproduction without any consideration of the content of particular scenes. Once such shots are selected without the consideration of the scene content, the content of the shots may be considered and analyzed to select one or more section of each shot for skimming reproduction.

A scene from a video content, such as a movie or drama, can be detected dependent upon the fact that a particular event, such as a gunfight scene, a dialogue scene, etc. can be detected. As a result, an index structure of a ToC (Table of Content) format can be automatically generated.

Figure 4:
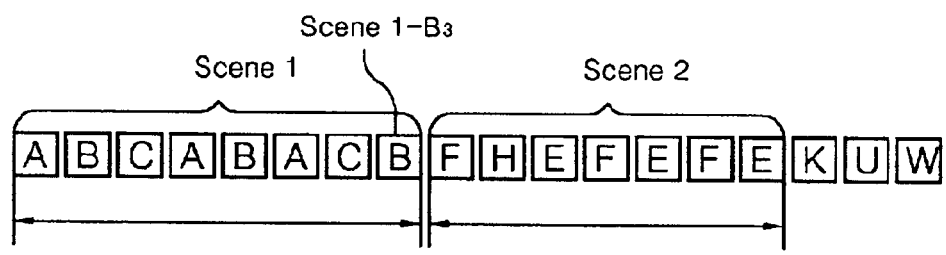
FIG. 4 illustrates a schematic diagram of a scene detection method using shot properties.

FIG. 4 illustrates a schematic diagram of a scene detection method using shot properties. Each shot is represented as an alphabet letter based on shot properties detected by the shot segmentation process illustrated in FIG. 3. In a shot transition structure in a dialogue scene of a drama or movie, in most cases, a feature pattern of shots, such as A, B, A, B, . . . is shown. FIG. 4 shows the process of determining the corresponding section as one scene if shots having similar properties are detected within a predetermined period of time. In the present invention, the use of alphabet letters is for the purpose of illustration only and other methods of designation may be implemented without deviating from the gist of the present invention.

In FIG. 4, scene 1 consists of shots having a feature value of As, Bs, and Cs. The shots having a feature value of A, B, C do not exist for a predetermined time after shot 1-B3, and thus the end of scene 1 is detected by detecting the end time of shot I-B3. In FIG. 4, scene 2 consists of shots having a feature value of Fs, Hs, Es. The feature values F, H, E of the shots do not exist for a predetermined time after the last shot of this scene. As a result the end time of scene 2 is similarly detected.

Alternatively, it is possible to detect a more accurate dialogue scene by the process of face detection and face recognition. Such a method is usually adapted to video contents, such as dramas or movies.

As described above, the present invention implements video skimming by using scene and shot information which are structural information for video content, and considers how to select a shot to be reproduced from many shots within a scene, how to select a section to be reproduced and a section to be skipped from the shot selected as the shot to be reproduced, how to select a reproduction length of the section to be reproduced, and how to reproduce in a reproduction section.

Figure 5:
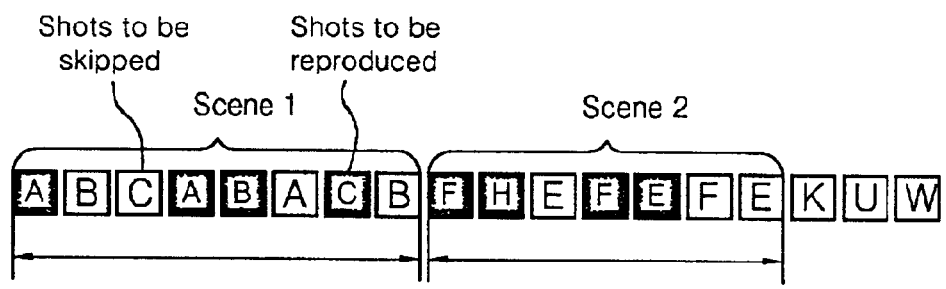
FIG. 5 illustrates a schematic diagram of the shots to be reproduced and the shots to be skipped using structural information.

FIG. 5 illustrates a schematic diagram of the shots to be reproduced and the shots to be skipped using structural information. FIG. 5 is an example of reproducing only a remarkable or representative scene only once among similar shots so that repetitive shots in scene 1 are not reproduced. In FIG. 5, structural information of the video content indexed by the shot segmentation process and the shot clustering process is used. The shots selected for reproduction during video skimming using structural information are indicated as shaded and shots to be skipped are not shaded. For the video skimming system using structural information according to the preferred embodiment of the present invention, the system initially determines the shots to be reproduced for each scene and determines the method for reproducing the individual shot.

According to the preferred embodiment of the present invention, the shot selection for determining the shots to be reproduced and shots to be skipped in each scene of a video stream will be achieved as follows.

To select a representative shot if many shots have similar properties in one scene, the outline of the scene content can be delivered to a viewer by selecting a representative shot and using the skimming method without any particular weight conditions. However, in the story structure, such as general dramas and movies, more information is expressed generally in the latter part of one scene. In other words, the introduction part is usually less important than the conclusion part. Therefore, in the step of selecting shots to be reproduced in skimming when similar shots appear many times in the scene, more information may be provided to a user by selecting shots in the latter part of the scene as shots to be reproduced.

Figure 6A:
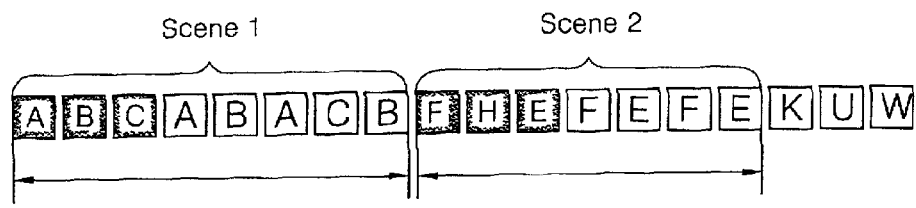
FIG. 6A illustrates a method for selecting shots to be reproduced in the former part of a scene.
Figure 6B:
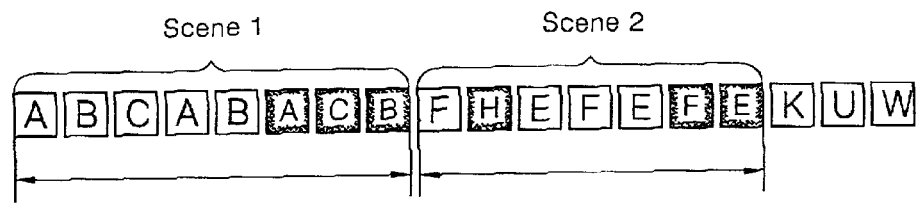
FIG. 6B illustrates a method for selecting shots to be reproduced in the latter part of the scene.

FIGS. 6A and 6B are examples of selecting only one shot for skimming if similar shots exist in one scene. In particular, FIG. 6A illustrates a method for selecting shots to be reproduced in the former part of a scene. FIG. 6B illustrates a method for selecting shots to be reproduced in the latter part of the scene.

In FIG. 6A, shots appearing at the very beginning are selected as shots to be reproduced among shots having shot properties of A, B, C. In FIG. 6B, shots appearing at the very last are selected as shots to be reproduced among shots having shot properties of A, B, C. Generally, the method of FIG. 6B produces a higher user satisfaction than the method in FIG. 6A.

Next, the method for selecting a section to be reproduced and a section to be skipped in each shot will now be described. In skimming using the structural information of video content, the summary of the video content can be provided by continuously reproducing the shots selected using the above process. However, the video skimming method of playing the full shot, and not a section from such shot, provides a low level summary in general. Usually, a user can understand the content of the full shot by viewing only parts of the shot. In the method for selecting one or more section to be reproduced from the shot selected for reproduction in video skimming using structural information of video content, the front section, rear section or center section of the shot may be selected unconditionally.

Figure 7:
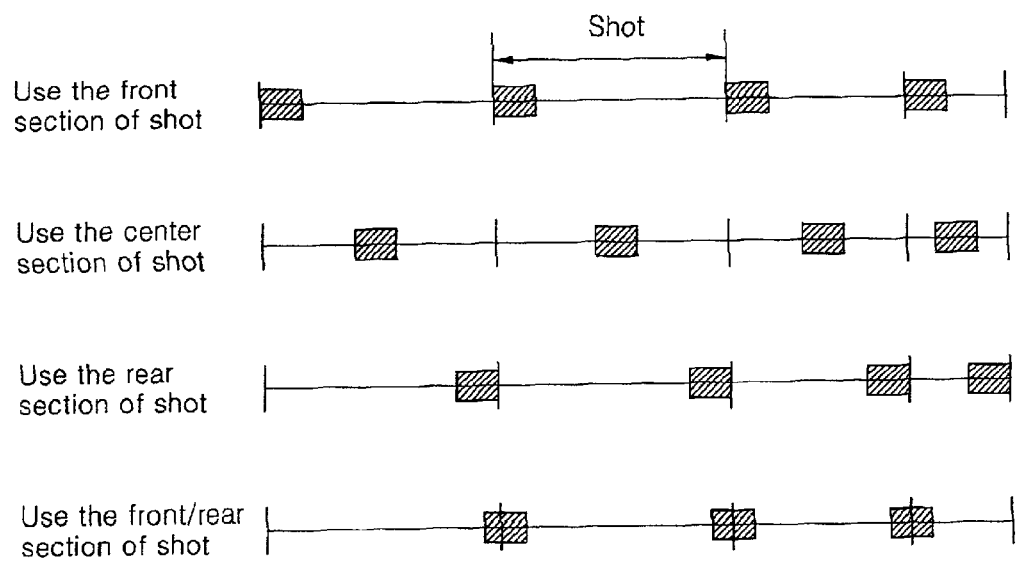
FIG. 7 is a view explaining a method for selecting a section to be skipped and a section to be reproduced in a shot.

FIG. 7 is a view illustrating a section to be skipped and a section to be reproduced in video skimming method using the front, rear and center sections or the front/rear sections of a shot at the same time. It is generally determined that a higher user satisfaction is achieved by skipping the front section of the corresponding shot and reproducing the rear section thereof, although it is different according to the genre of video. The reason is because the conclusion part (e.g., a goal scene in a soccer game) of the shot is more important than the introduction part or development part when understanding the content of the shot, and because parts of the content are expressed in the former part of the shot and the full content is expressed in the latter part if a method, such as a stepwise chart explanation, is used in a program like news.

However, the front section of the shot may be important according to the genre of video. For example, an educational broadcasting program, such as for solving problems, fall into such category.

In such a broadcasting program, the problem question is present at the front section of the shot, and then the work of solving the question is presented thereafter. Thus, in order to reproduce a desired section, much more information can be provided to a user by reproducing the front section of the shot, rather than by reproducing the rear section.

Therefore, according to the preferred embodiment of the present invention, the position or section to be reproduced in the shot can be selected differently according to the characteristics of the video content, and skimming can be implemented by using the front section, the center section and the rear section in combination with one another in the same shot.

The method for selecting a reproduction length according to the present invention is as follows. The method for selecting a reproduction length in each shot can be divided into the method for selecting segments of the same or fixed length as a section to be reproduced for every selected shots and the method for selecting a different reproduction length (i.e., a variable length) for each shot by using a shot property.

The above-described shot property is based on the average image/motion/audio similarities in one shot. Alternatively, other formulated value may be used to determine the image/motion/audio similarities. For example, a more monotonous scene has higher image/motion/audio similarities in one shot. In such a scene, skipping is performed more often. Conversely, a more complicated scene content has lower image/motion/audio similarities in the shot. In such a scene, the length of a segment unit to be reproduced may be dynamically adjusted by using the method for performing skipping less often.

The video skimming system according to the preferred embodiment provides a method for skipping a section with more information less often and skipping a section with a little information more often without depending upon the time length of the shot. By this method, video skimming with a user's high level comprehensibility can be provided as compared to the method for reproducing segments of the same length for every selected shots.

Figure 8:
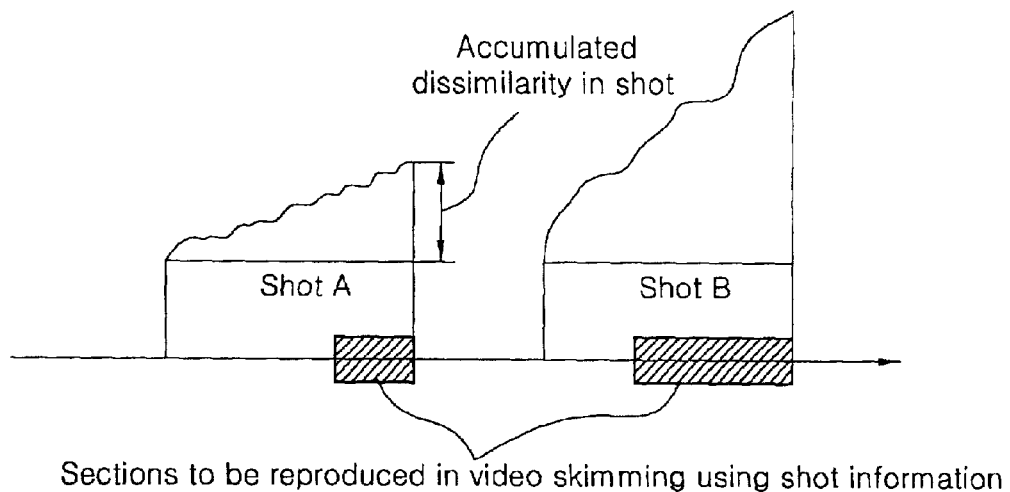
FIG. 8 illustrates a method for selecting a dynamic unit reproduction length using the dissimilarity of a shot.

FIG. 8 illustrates an example of a method for selecting a length to be reproduced and skipped based on image/motion/audio similarities in a shot.

In FIG. 8, a horizontal axis indicates time and a vertical axis indicates an accumulated value of image/motion/audio dissimilarities in the shot. These dissimilarity data are data representing shot properties extractable from a shot segmentation algorithm.

A frame or shot comparison technique may be used to determined the dissimilarities in the shot. For example, the difference in intensity and/or color histogram variance between adjacent frames or between frames at predetermined intervals is preferably measured. Alternatively, a temporal segmentation method or other suitable method known skilled in the art may also be used.

Referring to FIG. 8, since the average rate of change of shot A is smaller than that of shot B, although both shot A and shot B have a similar length, more sections are reproduced from shot B than shot A.

In this way, unless the length of a shot is considered in setting a reproduction section, an error situation in which the length of a reproduction section becomes larger than that of the corresponding shot may occur (if the shot is very short). Hence, in the skimming method of the present invention, in the case that the length of a unit section becomes larger than that of the corresponding shot, the full corresponding shot may be selected as a reproduction section. Alternatively, parts thereof may be selected as a reproduction section in consideration of the length of the corresponding shot.

The video skimming method according to the present invention can be adapted to a backward direction as well as a forward direction. When segments selected as reproduction sections in each shot are continuously reproduced, a user can generally understand the full video content and is able to obtain outline information of the video content in a short time. In addition, no user interaction is required for searching a desired position.

Next, the method for reproducing a scene and a reproduction section in a shot to be reproduced in the scene based on structural information of the video content will be explained.

In the video skimming method of the present invention, the method for reproducing segments selected as reproduction sections in each shot is as follows. A first method is to reproduced each segment in its entirety. A second method is to decode parts of frames comprising a reproduction section and reproducing the selective frames in the section by using skipping method.

The method for decoding parts of frames in a reproduction section and reproducing the same in the section by using skipping is a method for implementing quick skimming. For example, the frames to be displayed can be designated as frames at a predetermined interval time. In the method using an interframe compression, such as MPEG, the I frames having no interframe independency can be designated.

Figure 9:
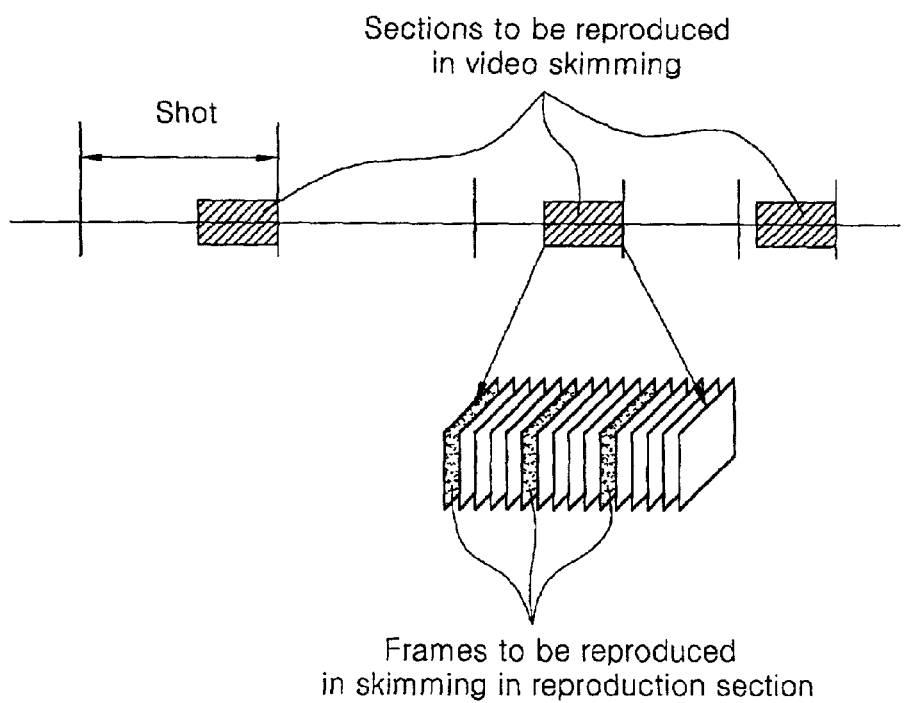
FIG. 9 is a view explaining a quick skimming method using skipping according to the preferred embodiment of the present invention.

FIG. 9 illustrates an example of a quick skimming method using skipping in a reproduction section. By using this method, a user can experience the effect of obtaining more information and reproducing a video content at a high speed.

Figure 10:
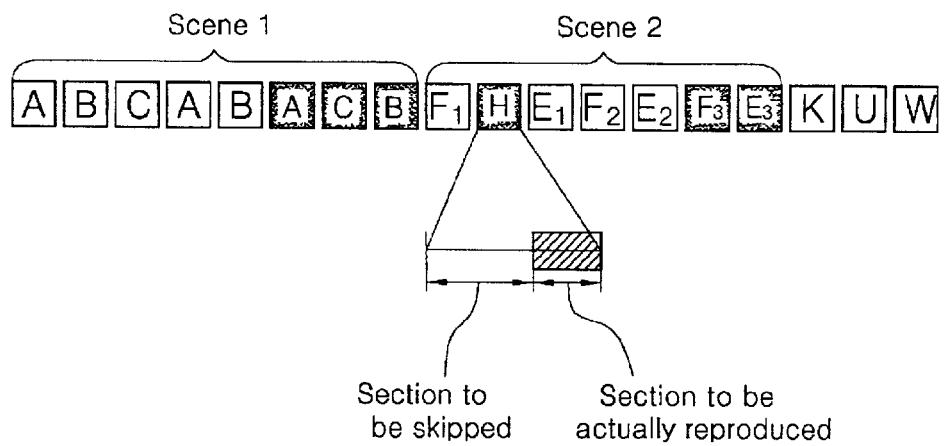
FIG. 10 illustrates a schematic diagram of a skimming method according to the preferred embodiment of the present invention using structural information of a video content.

As described above, in the video skimming system using structural information of video content according to the preferred embodiment of the present invention, segments are designated by two steps. FIG. 10 illustrates a summary of the video skimming method using structural information of video content according to the preferred embodiment of the present invention.

FIG. 10 is a view illustrating shots to be reproduced by the shot selection step shown in shade, in which only a section of a selected shot is reproduced and the remaining section is skipped.

When video skimming is requested, the video skimming system loads an index file containing the structural information of the video content, including the shot and scene information of the video content. The video skimming system determines what shots to reproduce for each scene and what shots to skip (in the shot selection step), and determines the segments to be reproduced and segments to be skipped for each shot selected for video skimming (in the segment designation step). Through the two determination steps, the segments to be reproduced are continuously outputted to a reproducing apparatus for displaying on a display unit.

Figure 11:
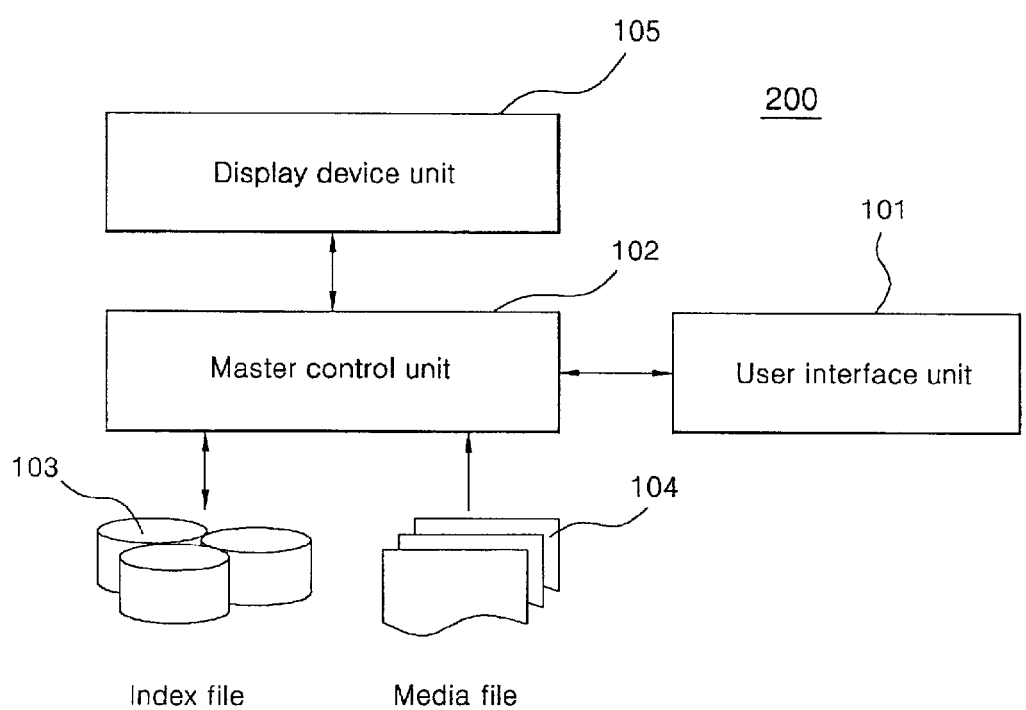
FIG. 11 illustrates a block diagram of a video skimming system using structural information of video content according to one embodiment of the present invention.

FIG. 11 illustrates a video skimming system 200 for a content-based video skimming according to one embodiment of the present invention. As illustrated in FIG. 11, the video skimming system 200 of the present invention includes a user interface unit 101 for inputting a user command, such as a degree of video skimming and a speed to be used in skimming, a master control unit 102 for skimming a corresponding video file based on indexing information on shots and scenes according to the user command inputted into the user interface unit 101, a media file 103 for providing digital video stream information to the master control unit 102, an index file 104 for providing the indexing information on shots and scenes as structural information corresponding to the media file, and a display device unit 105 for reproducing the video skimmed by the master control unit 102.

In the video skimming system 200 of the present invention of FIG. 11, the index file 104 may be included in the media file 103. The display device unit 105 is an output device for displaying a video stream including a monitor, a speaker, etc. The user interface unit 101 is an inputting means for receiving an input of a user including a keyboard, a mouse, a remote control, buttons, etc. The user requests for video skimming by using the user interface unit 101. The media file 103 is a file storing video (audio) data, and the index file 104 is a file storing index information on video containing shot clustering information and shot segmentation information.

When the video skimming is requested, a summary level (degree of skimming) can be designated and also a speed to be used in skimming can be designated. For example, the user designates how many minutes it takes to compress the full video content for viewing by using the user interface unit 101. The master control unit 102 determines what section of the shot will be reproduced for skimming based on the media file 103 and the subsequent information of the index file 102 according to the input of the user and determines at what speed each segment will be reproduced. By completing this process, the master control unit 102 provides a video skimming function to the user by decoding the media file 103 and displaying the corresponding frames on the display device unit 105.

As described above, the present invention describes a video skimming method for simultaneously complying with a user request for understanding the full video content and moving to a desired position within a restricted time under a digital video environment.

In the present invention, the possibility of reproducing a less important section relatively often or missing an actually desired scene is minimized and the possibility of repetitively reproducing a dialogue scene or a particular scene in turns is minimized, which are the problems that can occur to the existing video skimming method.

The video skimming method of the present invention minimizes the user input according to a user request for moving to a desired position.

By using the video skimming function of the present invention, the user can appreciate the full content within a short time, minimizes the bypassing of an important section in understanding the full content, and can easily skip an unimportant section.

In addition, the user can use the video skimming method of the present invention to move to a desired position. This method is advantageous in that it requires less user input as compared to the method using key frames.

The present invention may be employed, for instance, in reproducing video highlights, and can be utilized as a function of rapidly searching a desired scene while minimizing a user input request if it is used together with a high speed reproducing method in reproducing reproduction sections of each shot.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for skimming video data wherein the video data comprises a plurality of scenes, comprising the steps of:
   dividing each scene in the plurality of scenes into a plurality of shots, wherein each shot comprises of a plurality of sections,
      wherein each scene is associated with a first attribute defining scene information,
      wherein each shot is associated with a second attribute defining shot information, and
      wherein each section is associated with a third attribute defining temporal information;
   forming a structure information index corresponding to each shot, wherein the structure information index comprises:
      a first reference to each scene in association with the respective first attribute,
      a second reference to each shot in association with the respective second attribute, and
      a third reference to each section in association with the respective third attribute,
      such that at least one section from each shot in each scene is selectable based on at least one of the corresponding first, second, and third attributes;
   selecting at least one scene from the plurality of scenes based on the first attribute in the structure information index;
   selecting at least one shot from said at least one scene based on the second attribute in the structure information index;
   selecting at least one section from said at least one shot based on the third attribute in the structure information index; and
   reproducing a plurality of selected sections from a plurality of selected shots in the selected scenes to skim the video data comprising the plurality of scenes, such that reproduction of at least one of the scenes, shots, and sections with similar attributes is minimized.

2. The method of claim 1, wherein the scene information comprises a logical story unit, the shot information comprises a physical editing unit, and the temporal information comprises information concerning start and end of each shot.

3. The method of claim 1, wherein, in selecting shots to be reproduced from the multiple shots having the similar properties, shots to be used for skimming are selected by giving a higher weight value to shots located at a latter part of each scene.

4. The method of claim 1, when selecting at least one section from the selected shot, the selected section is from at least one of front section, rear section, center section of the selected shot.

5. The method of claim 1, wherein each reproduction length of selected sections from selected shots is the same.

6. The method of claim 5, wherein if the reproduction length of the selected section is larger than a shot length of the corresponding selected shot, then the reproduction length of the selected section is decreased to be less than or equal to the shot length.

7. The method of claim 1, wherein each section comprises a plurality of frames and each reproduction length of selected sections from selected shots is chosen in response to a dissimilarity factor of neighboring frames.

8. The method of claim 7, wherein the dissimilarity factor is determined in response to at least one of image, motion and audio similarities in individual shots, and the reproduction length of selected section is adjusted in response to the dissimilarity factor.

9. The method of claim 8, wherein the image, motion and audio similarities in the selected shot representative of the selected scene includes similarities in frames, motion vectors and audio data with different time positions.

10. The method of claim 7, wherein if the reproduction length of the selected section is larger than a shot length of the corresponding selected shot, then the reproduction length of the selected section is decreased to be less than or equal to the shot length.

11. The method of claim 1, wherein the reproduction of selected sections is varied in response to an external input.

12. The method of claim 11, wherein the selected sections is reproduced at a high speed by increasing a number of frames to be decoded per unit time.

13. The method of claim 12, wherein each selected section comprises a plurality of frames and the selected sections are reproduced by selecting at least one frame from the corresponding section.

14. The method of claim 13, when the video data uses a coding scheme utilizing interframe compression, then I frames are selected for obtaining frame data for decoding only corresponding frames.

15. A method for skimming video data, wherein the video data comprises a plurality of scenes, the method comprising:
   obtaining a plurality of shots for each scene using a shot segmentation and forming a structure information index corresponding to each shot;
   selecting at least one shot from each scene based on the structure information index, wherein when shots are being selected from each scene, selection of multiple shots having similar properties is minimized;
   selecting at least one section from the selected shot; and reproducing selected sections from each scene to skim the video data.

16. A video skimming system for skimming video data wherein the video data is partitioned into a plurality of scenes, the video skimming system comprising:
   means for obtaining a plurality of shots for each scene using a shot segmentation and forming a structure information index corresponding to each shot;
   means for selecting at least one shot from each scene based on the structure information index;
   means for selecting at least one section from the selected shot; and means for reproducing selected sections from each scene to skim the video data, wherein when shots are being selected from each scene, selection of multiple shots having similar properties is minimized.

17. A video skimming apparatus for searching and browsing digital video data, comprising:

a user interface unit for inputting external control information;

a control unit for skimming the video data based on a structural information index for the video content according to the external control information from the user interface unit and selecting at least one shot from each scene based on the structure information index and selecting at least one section from the selected shot;

a video information file for providing the structural information index for the video data to the control unit; and a display unit for reproducing the video skimmed by the control unit, wherein when shots are being selected from each scene, selection of multiple shots having similar properties is minimized.

18. The video skimming apparatus of claim 17, wherein, the user interface unit comprises a unit for designating a summary level as a degree of video skimming or a unit for designating the speed of a reproduction section in video skimming in order to select the summary level or reproduction speed of video in video skimming.

19. The video skimming apparatus of claim 18, wherein the control unit reads the structure information index related to shot segmentation information and shot clustering information from an index file according to a skimming condition by using the external control information, calculates segments to be reproduced conforming to the video skimming condition, reproduces the corresponding segments from the video data, and outputs to the display unit.

20. A method for skimming video data wherein the video data comprises a plurality of shots, wherein a structure information index is prepared based on content-based information using a shot segmentation, comprising the steps of:

selecting at least one shot from the video data based on the structure information index;

selecting at least one section from the selected shot; and reproducing selected sections from each scene to skim the video data wherein when sections are being selected from each shot, selection of multiple sections having similar properties is minimized.

21. The method of claim 20 wherein the structural information index includes at least one of shot information and temporal information.

22. The method of claim 21, wherein the shot information includes a physical editing unit, and the temporal information includes information concerning start and end of each shot.

23. The method of claim 20, when selecting at least one section from the selected shot, the selected section is from at least one of front section, rear section, center section of the selected shot.

24. A video skimming system for skimming video data wherein the video data is partitioned into a plurality of shots, wherein a structure information index is prepared based on content-based information using a shot segmentation, the video skimming system comprising:

means for selecting at least one shot from the video data based on the structure information index;

means for selecting at least one section from the selected shot; and means for reproducing selected sections from each scene to skim the video data wherein when sections are being selected from each shot, selection of multiple sections having similar properties is minimized.

* * * * *